(12) United States Patent
Nagasaka et al.

(10) Patent No.: US 10,933,383 B2
(45) Date of Patent: *Mar. 2, 2021

(54) ZEOLITE MEMBRANE STRUCTURE

(71) Applicant: NGK INSULATORS, LTD., Nagoya (JP)

(72) Inventors: Ryujiro Nagasaka, Nagoya (JP); Hideyuki Suzuki, Nagoya (JP); Akimasa Ichikawa, Nagoya (JP); Shinji Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,275

(22) Filed: Apr. 10, 2020

(65) Prior Publication Data

US 2020/0238225 A1    Jul. 30, 2020

Related U.S. Application Data

(63) Continuation of application No. 15/701,569, filed on Sep. 12, 2017, now Pat. No. 10,688,445, which is a continuation of application No. PCT/JP2016/059048, filed on Mar. 22, 2016.

(30) Foreign Application Priority Data

Mar. 31, 2015   (JP) .................. 2015-071566

(51) Int. Cl.
| | |
|---|---|
| B01D 71/02 | (2006.01) |
| C01B 39/48 | (2006.01) |
| B01D 69/12 | (2006.01) |
| B01D 67/00 | (2006.01) |
| B01D 69/02 | (2006.01) |
| B01J 35/00 | (2006.01) |
| B01J 35/10 | (2006.01) |
| B01J 37/02 | (2006.01) |
| B01J 35/06 | (2006.01) |
| C01B 39/02 | (2006.01) |
| B01J 29/06 | (2006.01) |
| B01J 39/14 | (2006.01) |

(52) U.S. Cl.
CPC ....... *B01D 71/028* (2013.01); *B01D 67/0051* (2013.01); *B01D 69/02* (2013.01); *B01D 69/12* (2013.01); *B01J 35/002* (2013.01); *B01J 35/0006* (2013.01); *B01J 35/065* (2013.01); *B01J 35/1066* (2013.01); *B01J 37/0215* (2013.01); *B01J 37/0244* (2013.01); *B01J 37/0246* (2013.01); *C01B 39/02* (2013.01); *C01B 39/48* (2013.01); *B01D 2325/02* (2013.01); *B01D 2325/04* (2013.01); *B01J 29/06* (2013.01); *B01J 39/14* (2013.01)

(58) Field of Classification Search
CPC ...... B01J 29/06; B01J 35/0006; B01J 35/002; B01J 35/065; B01J 35/1066; B01J 37/0215; B01J 37/0244; B01J 37/0246; B01J 20/18; B01J 20/28033; B01J 20/28054; B01J 20/28085; B01D 71/028; B01D 69/12; B01D 69/10; B01D 69/02; B01D 67/0051; B01D 2325/04; B01D 2325/02
USPC ................. 502/4, 60, 400, 407, 414, 527.12
See application file for complete search history.

(56) References Cited

U.S. PATENT DOCUMENTS

| | | | | |
|---|---|---|---|---|
| 6,090,289 A | * | 7/2000 | Verduijn ............ | B01D 67/0051 210/644 |
| 6,177,373 B1 | * | 1/2001 | Sterte ................. | B01D 67/0051 502/4 |
| 6,472,016 B1 | * | 10/2002 | Soria .................... | B01D 53/228 427/245 |
| 7,049,259 B1 | * | 5/2006 | Deckman ........... | B01D 67/0046 502/4 |
| 10,688,445 B2 | * | 6/2020 | Nagasaka ............. | B01D 69/02 |
| 2004/0173094 A1 | | 9/2004 | Nakayama et al. | |
| 2005/0229779 A1 | | 10/2005 | Nakayama et al. | |
| 2008/0047432 A1 | | 2/2008 | Nonaka et al. | |
| 2011/0160039 A1 | | 6/2011 | Himeno et al. | |

FOREIGN PATENT DOCUMENTS

| | | |
|---|---|---|
| CN | 101301589 A | 11/2008 |
| JP | H09-202615 | 8/1997 |
| JP | H09-313903 | 12/1997 |
| JP | 2004-066188 A | 3/2004 |
| JP | 2004-082008 A | 3/2004 |
| JP | 2008-018387 A | 1/2008 |
| JP | 2008-074695 A | 4/2008 |

(Continued)

OTHER PUBLICATIONS

International Search Report and Written Opinion (Application No. PCT/JP2016/059048) dated Jun. 7, 2016.

(Continued)

*Primary Examiner* — Elizabeth D Wood
(74) *Attorney, Agent, or Firm* — Burr & Brown, PLLC

(57) ABSTRACT

A zeolite membrane structure includes a porous support, and a zeolite membrane. The zeolite membrane has a first zeolite layer located in a surface of the porous support, and a second zeolite layer located outside of the surface of the porous support and integrally formed with the first zeolite layer. The porous support has an outermost layer in which the first zeolite layer is located. An average thickness of the first zeolite layer is less than or equal to 5.4 micrometers. A porosity of the outermost layer is greater than or equal to 20% and less than or equal to 60%.

13 Claims, 2 Drawing Sheets

(56) References Cited

FOREIGN PATENT DOCUMENTS

| JP | 2008-253931 A | 10/2008 |
|---|---|---|
| JP | 2011-131174 A | 7/2011 |
| JP | WO 2012/046545 | 2/2014 |
| WO | 2016/051910 A1 | 4/2016 |

OTHER PUBLICATIONS

English translation of International Preliminary Report on Patentability (Chapter I) (Application No. PCT/JP2016/059048) dated Oct. 12, 2017.
Chinese Office Action (Application No. 201680011593.9) dated Oct. 24, 2019 (with English translation).

* cited by examiner

ZEOLITE MEMBRANE STRUCTURE

CROSS REFERENCE TO RELATED APPLICATIONS

This application is a continuation of U.S. application Ser. No. 15/701,569, filed Sep. 12, 2017, now U.S. Pat. No. 10,688,445, which is a continuation of International Application No. PCT/JP2016/059048, filed Mar. 22, 2016, which designated the United States, the entireties of which are incorporated herein by reference.

FIELD OF THE INVENTION

The present invention relates to a zeolite membrane structure and to a method for producing the same.

BACKGROUND OF THE INVENTION

A method is known of forming a zeolite membrane on a surface of a porous support by use of a zeolite seed crystal (referred to below as "seed crystal") (for example, reference is made to Japanese Patent Application Laid-Open No. 2004-82008 and Published Japanese Translation No. 2008-74695 of the PCT International Application).

The zeolite membrane is formed by crystalline growth in a membrane configuration of a seed crystal that has been coated onto the surface of the porous support.

SUMMARY OF THE INVENTION

Technical Problem

However, since a portion of the coated seed crystal disperses into an inner part of the porous support, there is a problem that there tends to be an increase in the substantial membrane thickness of the resulting zeolite membrane and therefore permeability is decreased.

The present invention is proposed based on the new insight above, and has the object of providing a zeolite membrane structure that enhances the permeability of a zeolite membrane, and to a method for producing the same.

Solution to Problem

The zeolite membrane structure according to the present invention comprises a porous support and a zeolite membrane. The zeolite membrane has a first zeolite layer located in a surface of the porous support, and a second zeolite layer located outside of the surface of the porous support and which is integrally formed with the first zeolite layer. The porous support has an outermost layer in which the first zeolite layer is located. The first zeolite layer has an average thickness of less than or equal to 5.4 micrometers. The 50% diameter in a volume-accumulated pore diameter distribution of the outermost layer measured by use of a pore diameter distribution measurement apparatus is greater than or equal to 0.050 micrometers and less than or equal to 0.150 micrometers.

Effect of Invention

According to the present invention, it is possible to provide a zeolite membrane structure that enhances the permeability of a zeolite membrane, and to a method for producing the same.

DETAILED DESCRIPTION OF THE INVENTION

Configuration of Separation Membrane Structure 10

Figure 1:
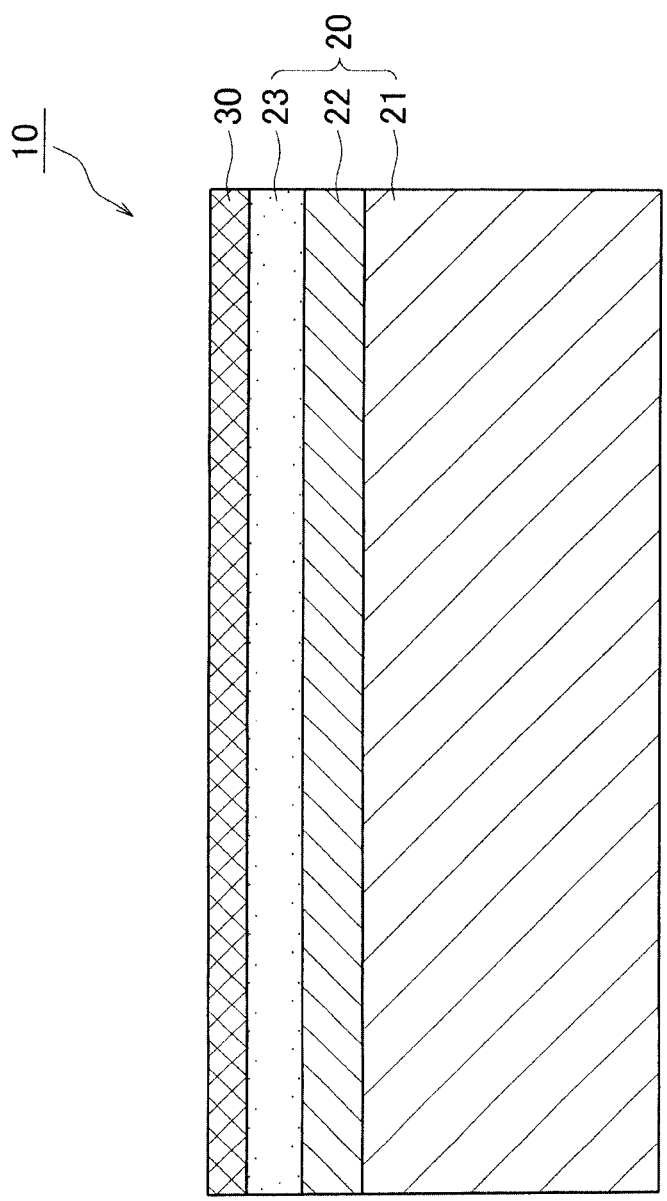
FIG. 1 is a cross-sectional view of a separation membrane structure.

FIG. 1 is a cross-sectional view of a configuration of the separation membrane structure 10. The separation membrane structure 10 includes a porous support 20 and a zeolite membrane 30.

The porous support 20 supports the zeolite membrane 30. The porous support 20 exhibits chemical stability that enables the formation (crystallization, coating, or precipitation) of the zeolite membrane 30 on a surface. The porous support 20 may be configured in a shape to enable supply a mixed fluid that is the subject matter to be separated to the zeolite membrane 30. The shape of the porous support 20 for example may be configured in a honeycomb, monolithic, flat, tubular, cylindrical, columnar, square column shape, or the like. In the present embodiment, the porous support 20 has a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, silver, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The average particle diameter of the substrate 21 may be configured for example as 5 micrometers to 25 micrometers. The average particle diameter of the substrate 21 is the 50% diameter (a so-called D50) in a volume-accumulated pore diameter distribution of the substrate 21 measured by use of a mercury porosimeter (an example of a pore diameter distribution measurement apparatus). The porosity of the substrate 21 may be configured for example as 25% to 50%. The average particle diameter of the porous material that configures the substrate 21 may be configured for example as 10 micrometers to 100 micrometers. The average particle diameter of the substrate 21 is the value of the arithmetic mean for the maximum diameter of 30 measured particles that are measured by cross sectional micro-structure observation by use of a scanning electron microscope (SEM).

The intermediate layer 22 is formed on the substrate 21. The intermediate layer 22 can be configured by the same porous material as that used in the substrate 21. The average pore diameter of the intermediate layer 22 may be smaller than the average pore diameter of the substrate 21, and may be configured for example as 0.005 micrometers to 2 micrometers. The average pore diameter of the intermediate layer 22 is the 50% diameter (a so-called D50) in a volume-accumulated pore diameter distribution of the intermediate layer 22 measured by use of a perm-porometer (an example of a pore diameter distribution measurement apparatus). The porosity of the intermediate layer 22 may be configured for example as 20% to 60%. The thickness of the intermediate layer 22 may be configured for example as 10 micrometers to 500 micrometers.

The surface layer 23 is formed on the intermediate layer 22. The surface layer 23 can be configured by a porous material that can be used in the substrate 21. The average pore diameter of the surface layer 23 is greater than or equal to 0.050 and less than or equal to 0.150 micrometers. The average pore diameter of the surface layer 23 is the 50% diameter (that is to say, D50) in a volume-accumulated pore diameter distribution of the surface layer 23 measured by use of a perm-porometer (an example of a pore diameter distribution measurement apparatus). The 90% diameter (that is to say, D90) in a volume-accumulated pore diameter distribution of the surface layer 23 is greater than or equal to 0.050 and less than or equal to 0.180 micrometers. The D90 of the surface layer 23 is preferably less than 0.150 micrometers, and more preferably less than or equal to 0.080 micrometers. In the present embodiment, the pore diameter of the surface layer 23 is equal to the pore diameter of the outermost layer 23a as described below. The porosity of the surface layer 23 may be configured for example to 20% to 60%. The thickness of the surface layer 23 for example may be configured as 5 micrometers to 300 micrometers.

The zeolite membrane 30 is supported by the porous support 20. The zeolite membrane 30 makes contact with the surface layer 23 of the porous support 20. The zeolite membrane 30 is manufactured by use of a zeolite seed crystal (referred to below as a "seed crystal") that is described below. Since there is no particular limitation in relation to the framework structure (type) of the zeolite, for example, ABW, ACO, AEI, AEN, AFN, AFT, AFV, AFX, APC, ATN, ATT, ATV, AVL, AWO, AWW, BIK, CAS, CDO, CHA, DAC, DDR, DFT, EAB, EEI, EPI, ERI, ESV, GIS, HEU, IFY, IHW, IRN, ITE, ITW, JBW, JOZ, JSN, KFI, LEV, LTA, LTJ, MER, MON, MTF, MVY, NPT, NSI, OWE, PAU, PHI, RHO, RTE, RTH, RWR, SAS, SAT, SBN, SFW, SIV, TSC, UEI, UFI, VNI, WEI, WEN, YUG, and ZON, or the like are may be used. In particular, AEI, CHA, DDR, HEU, LEV, LTA, and RHO are preferred due to ease of zeolite crystallization.

Figure 2:
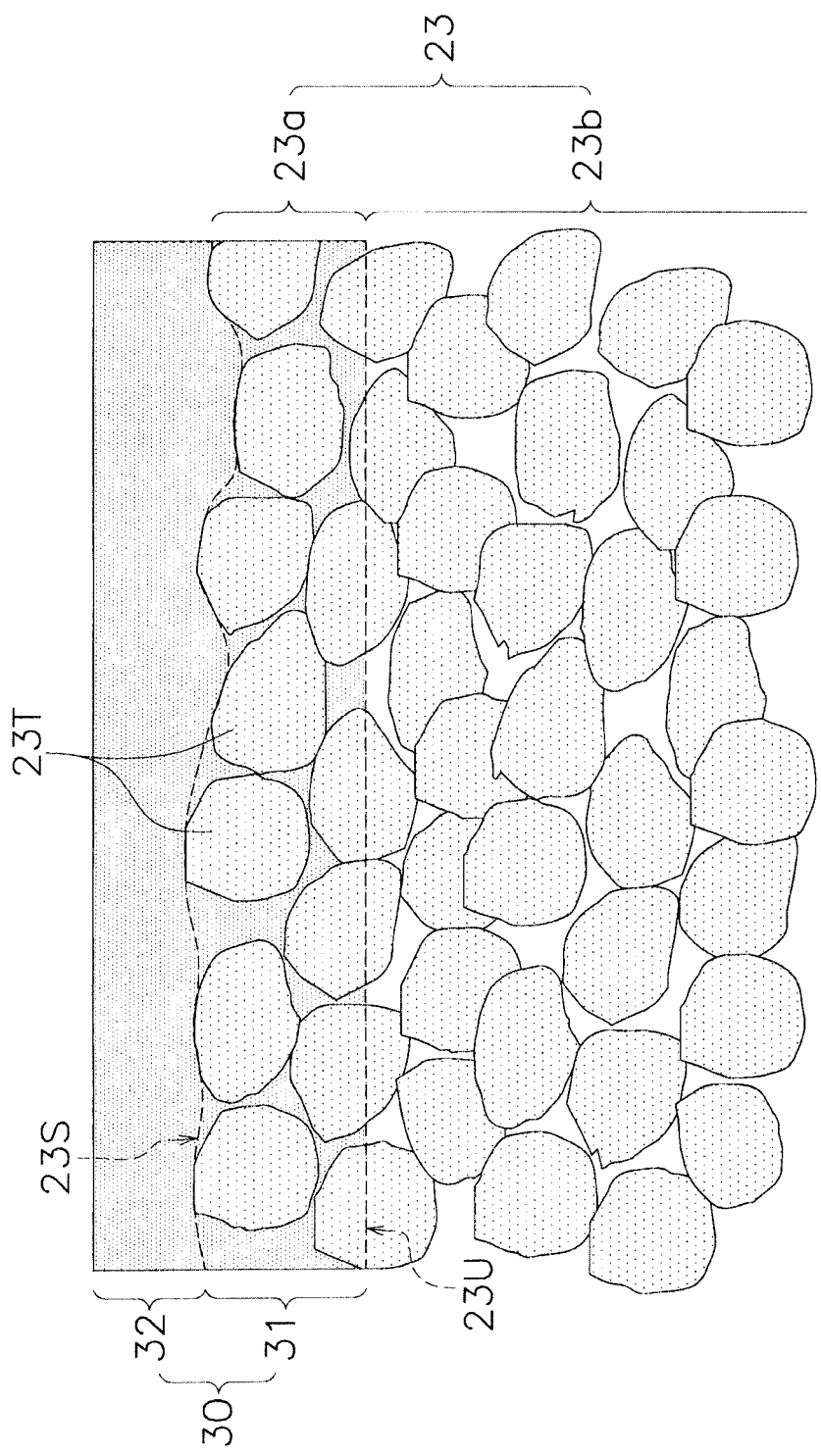
FIG. 2 is a partially enlarged view of FIG. 1.

FIG. 2 is a partially enlarged view of FIG. 1. As disclosed in FIG. 2, the zeolite membrane 30 includes a first zeolite layer 31 and a second zeolite layer 32, and the surface layer 23 includes an outermost layer 23a and an inner layer 23b.

The first zeolite layer 31 is located in the surface 23S of the surface layer 23. That is to say, the first zeolite layer 31 is disposed in an inner portion of the surface layer 23. The first zeolite layer 31 is formed by penetration into a space of the constituent particles 23T of the surface layer 23. The second zeolite layer 32 is located outside of the surface 23S of the surface layer 23. That is to say, the second zeolite layer 32 in an outer portion of the surface layer 23. The second zeolite layer 32 is disposed on the first zeolite layer 31 and is integrally formed with the first zeolite layer 31.

The first zeolite layer 31 functions as a filtration membrane in the same manner as the second zeolite layer 32. Consequently, the permeability of the zeolite membrane 30 is enhanced to the degree that the thickness of the first zeolite layer 31 is reduced. In the present embodiment, the average thickness of the first zeolite layer 31 is less than or equal to 5.4 micrometers. The average thickness of the first zeolite layer 31 is preferably less than or equal to 2.5 micrometers, and more preferably less than or equal to 1.4 micrometers. The average thickness of the second zeolite layer 32 may be configured as greater than or equal to 0.9 micrometers and less than or equal to 3.2 micrometers. The average thickness of the second zeolite layer 32 is preferably less than or equal to 2.5 micrometers, and still more preferably less than or equal to 1.5 micrometers. The ratio of the average thickness of the first zeolite layer 31 to the average thickness of the second zeolite layer 32 (average thickness of the first zeolite layer 31/average thickness of the second zeolite layer 32) is preferably less than or equal to 1.25, and more preferably less than or equal to 1.0.

The "average thickness" of each layer in the present embodiment denotes the value of the arithmetic mean for the thickness of at least 3 positions that are measured by cross sectional micro-structure observation by use of a scanning electron microscope (SEM), and in this context, "thickness" denotes the width of each layer in a thickness direction that is perpendicular to the surface 23S. Therefore the average thickness of the first zeolite layer is the average distance of the surface 23S of the surface layer 23 and the inner surface 23U of the first zeolite layer 31.

The first zeolite layer 31 is disposed on the outermost layer 23a. The outermost layer 23a is integrally formed with the first zeolite layer 31. The first zeolite layer 31 penetrates into the spaces of the constituent particles 23T of the outermost layer 23a. The average thickness of the outermost layer 23a is equal to the average thickness of the first zeolite layer 31. The average pore diameter of the outermost layer 23a is equal to the average pore diameter of the surface layer 23. The inner layer 23b is formed on the inside of the outermost layer 23a. The inner layer 23b is a region of the surface layer 23 other than the outermost layer 23a. The first zeolite layer 31 does not penetrate the inner layer 23b. In other words, the inner layer 23b makes contact with the first zeolite layer 31.

The interface of the outermost layer 23a and the inner layer 23b is defined by an inner surface 23U of the first zeolite layer 31.

Method of Manufacturing Separation Membrane Structure

A method of manufacturing the separation membrane structure 10 will be described.

Firstly, a green body for the substrate 21 is formed into a desired shape by use of extrusion molding, a press molding method, a slip cast method, or the like. Next, the green body for the substrate 21 is fired (for example, 900 degrees C. to 1450 degrees C., 1 hour to 100 hours) to thereby form the substrate 21.

Then, an intermediate layer slurry is formulated by use of a porous material having a desired particle radius, an organic binder, a pH adjusting agent, and a surface active agent, or the like, and is formed as a membrane on a surface of the substrate 21 to thereby form a green body for the intermediate layer 22. Next, the green body for the intermediate layer 22 is fired (for example, 900 degrees C. to 1450 degrees C., 1 hour to 100 hours) and to thereby form the intermediate layer 22.

Then, a surface layer slurry is formulated by use of a porous material having a desired particle radius, an organic binder, a pH adjusting agent, and a surface active agent, or the like, and is formed as a membrane on a surface of the intermediate layer 22 to thereby form a green body for the surface layer 23. Next, the green body for the surface layer 23 is fired (for example, 900 degrees C. to 1450 degrees C., 1 hour to 100 hours) and to thereby form the surface layer 23. At this time, the rate of temperature increase is less than or equal to 30 degrees C./h. Therefore the D50 of the surface layer 23 can be controlled to greater than or equal to 0.050 micrometers and less than or equal to 0.150 micrometers, and the D90 of the surface layer 23 can be controlled to greater than or equal to 0.050 micrometers and less than or equal to 0.180 micrometers.

Next, a nucleus that contains the zeolite (referred to below as "nucleus") is prepared. The nucleus is preferably a mixture of a zeolite crystal, or a zeolite crystal and amorphous silica. The average particle diameter of the nucleus can be configured as greater than or equal to 0.100 micrometers and less than or equal to 0.250 micrometers. The average particle diameter of the nucleus is the 50% diameter (the so-called D50) in a volume-accumulated particle size distribution of the nucleus measured by use of a laser diffraction and scattering method. There is no particular limitation on the method of manufacturing the nucleus.

Next, a starting material solution (starting material sol) is prepared that contains a nucleus, silica, and 1-adamantane amine as a structure regulating agent. The starting material solution may also contain water, ethylene diamine, or the like.

The seed crystal is produced by heating (hydrothermal synthesis) the starting material solution to 130 to 180 degrees C. for at least four hours. At that time, it is possible to control the 10% diameter (the so-called D10) in a volume-accumulated particle size distribution of the seed crystal that is measured by use of a laser diffraction and scattering method to greater than or equal to 0.050 micrometers and less than or equal to 0.150 micrometers by configuring the rate of temperature increase to be less than or equal to 50 degrees C./h. As a result, the ratio of the D10 of the seed crystal relative to the D90 of the surface layer 23 can be adjusted to greater than or equal to 0.5.

Next, a slurry for seeding is prepared by diluting with a solvent (water, ethanol, or an aqueous solution of ethanol, or the like) so that the seed crystal is less than or equal to 1 mass %.

Next, the slurry for seeding is coated onto the surface of the surface layer 23 by a method such as a flow-down method, a dipping method or the like. At that time, the D50 of the surface layer 23 is greater than or equal to 0.050 micrometers and less than or equal to 0.150 micrometers, and since the ratio of the D10 of the seed crystal relative to the D90 of the surface layer 23 is greater than or equal to 0.5, diffusion of the seed crystal into an inner portion of the surface layer 23 can be inhibited.

Next, the porous support 20 with the seed crystals attached is immersed inside a pressure-resistant vessel containing a starting material solution that includes a silica source, an alumina source, an alkali source, and water or the like. An organic template may be included in the starting material solution.

Next, the pressure-resistant vessel is placed in a drying unit and subjected to heating (hydrothermal synthesis) for about 1 to 240 hours at 100 to 200 degrees C. to thereby cause crystal growth of the seed crystal into a membrane configuration. In this manner, the first zeolite layer 31 is formed integrally with the outermost layer 23a, and the second zeolite layer 32 is formed on the outermost layer 23a. At that time, as stated above, since diffusion of the seed crystal into an inner portion of the surface layer 23 is inhibited, the average thickness of the first zeolite layer 31 that undergoes crystal growth in an inner portion of the surface layer 23 is inhibited to less than or equal to 5.4 micrometers.

Next, the porous support 20 formed the zeolite membrane 30 is washed and dried at 80 to 100 degrees C.

Then, in a configuration in which an organic template is included in the starting material solution, the porous support 20 is placed in an electric furnace, and heated in an atmosphere of air (400 to 800 degrees C., 1 to 200 hours) to thereby combust and remove the organic template.

Other Embodiments

In the present embodiment, although the porous support 20 includes the substrate 21, the intermediate layer 22 and the surface layer 23, one or both of the intermediate layer 22 and the surface layer 23 may be omitted. In a configuration in which the porous support 20 does not include the surface layer 23, the outermost layer 23a is formed on the intermediate layer 22. In a configuration in which the porous support 20 does not include the intermediate layer 22 and the surface layer 23, the outermost layer 23a is formed on the substrate 21.

In the present embodiment, although the separation membrane structure 10 includes the porous support 20 and the zeolite membrane 30, a functional membrane or a protective membrane may be further provided in a stacked configuration onto the zeolite membrane 30. This type of membrane may be an inorganic membrane such a zeolite membrane, carbon membrane, silica membrane, or the like, or may be an organic membrane such as a polyimide membrane, silicone membrane or the like.

Examples

The examples of the present invention will be described below. However, the present invention is not thereby limited to the following examples.

Preparation of Sample No. 1 to No. 20

Firstly, 20 parts by mass of an inorganic binder 20 are added to 100 parts by mass of alumina particles 100 having an average particle diameter of 50 micrometers, and then water, a dispersing agent and a thickener are added, and kneaded to prepare a clay.

Next, a green body for the substrate that includes 55 through-holes is formed by extrusion molding of the clay. Then, the green body for the substrate is fired (1250 degrees C., 1 hour).

Then, an intermediate layer slurry is prepared by adding PVA to titania and alumina and is deposited onto an inner surface of the through holes by a filtration method to thereby prepare a green body for an intermediate layer. Then, the green body for the intermediate layer is fired (1250 degrees C., 2 hours) to form the intermediate layer.

Next, a surface layer slurry is prepared by adding PVA to alumina and is deposited onto a surface of the intermediate layer by a filtration method to thereby prepare a green body for a surface layer. Then, the green body for the surface layer is fired (1250 degrees C., 1 hour) to form the surface layer. At that time, the rate of temperature increase in Sample No. 1 to No. 18 is 25 degrees C./h and the rate of temperature increase in Sample No. 19 and No. 20 is 50 degrees C./h.

In this manner, a monolithic porous support (diameter 30 mm×length 160 mm) is completed.

Next, a DDR-type zeolite seed crystal is prepared as described below.

Next, after ethylene diamine (manufactured by Wako Pure Chemical Industries, Ltd.) is placed in a fluororesin sealed container, 1-adamantane amine (manufactured by Sigma Aldrich) is added, and the 1-adamantane amine is completely dissolved by ultrasonic waves.

Next, an aqueous solution containing a DDR-type zeolite crystal as a nucleus is placed in another container, a silica sol containing silica (Snowtex S, manufactured by Nissan Chemical Industries, Ltd.) is added and stirred to thereby prepare a silica sol containing a nucleus. The DDR-type zeolite crystal for use as a nucleus is prepared based on the method disclosed in PCT Laid Open Application 2010/090049A1 in which a DDR zeolite powder having an average particle diameter of 2.9 micrometers is pulverized using a bead mill (Product Name: Star Mill) manufactured by Ashizawa Finetech Ltd. and then coarse particles are removed by centrifugation.

Next, the silica sol containing the nucleus is added briskly to the sealed container containing the ethylene diamine in which 1-adamantane amine is dissolved and stirred until the mixed liquid in the sealed container becomes clear to thereby obtain a starting material solution (starting material sol).

Next, the starting material solution is placed in a stainless steel pressure-resistant container including an inner tube of fluorocarbon resin and heated (hydrothermal synthesis) for 15 hours at 150 degrees C. At this time, the rate of temperature increase in Sample No. 1 to No. 18 is 50 degrees C./h and the rate of temperature increase in Sample No. 19 and No. 20 is 25 degrees C./h.

Next, a dispersion is obtained in which the zeolite seed crystals are dispersed by washing until reaching pH10.

Next, the seed crystal dispersion is subjected to ultrasonic waves, then the seed crystal dispersion is dripped into ethanol and stirred to prepare a slurry for seeding having a concentration of seed crystals of 0.075 mass %.

Next, the slurry for seeding is poured from above the porous support that is configured in a vertical position so that the slurry for seeding flows into the 55 cells formed in the porous support.

Next, air is caused to flow for 10 minutes at room temperature at a rate of 2 to 7 m/sec into the cells and thereby dry the slurry for seeding that is coated onto the walls of the cells.

Next, after ethylene diamine (manufactured by Wako Pure Chemical Industries, Ltd.) is placed in a fluororesin container, 1-adamantane amine (manufactured by Sigma Aldrich) is added and completely dissolved.

Then, a silica sol containing silica (Snowtex S, manufactured by Nissan Chemical Industries, Ltd.) and ion exchange water are added to another container and gently stirred to thereby prepare a silica dispersion.

Next, an ethylene diamine solution containing dissolved 1-adamantane amine is added into the silica dispersion and stirred to prepare a membrane-formation starting material solution.

Then, the porous support with the seed crystals attached is placed in a stainless steel pressure-resistant container including an inner tube of fluorocarbon resin.

Next, the zeolite membrane containing 1-adamantane amine is formed on the cell walls of the porous support by placing the membrane-formation starting material solution in a vessel and heating (hydrothermal synthesis) for 20 hours at 125 degrees C.

Then, the porous support is removed from the vessel and washed.

The 1-adamantane amine is combusted and removed by heating the DDR-type zeolite membrane at 450 degrees C. for 100 hours. Then the DDR-type zeolite membrane is washed and dried (80 degrees C.).

Measurement of Pore Diameter of Seed Crystal

After dripping approximately 20 ml of the seed crystal dispersion of each sample to configure a measureable concentration, a suspension of the seed crystals is obtained by causing a dispersion by use of ultrasonic waves for at least 5 minutes.

Next, a volume-accumulated pore diameter distribution of the seed crystals from a laser diffraction and scattering method is obtained by use of a dynamic light-scattering particle diameter distribution measurement device (manufactured by Nikkiso, Product Name: Nanotrac).

Then, as shown in Table 1, the 10% diameter (D10) of the seed crystals is calculated from the volume-accumulated pore diameter distribution.

Pore Diameter Measurement of Porous Support

A surface layer of the porous support is exposed by immersing each sample in a weak alkali solution (NaOH solution) to dissolve the DDR-type zeolite membrane.

Then, a pore diameter distribution measurement device (Automated Perm Porometer, porous material automatic pore diameter distribution measurement system, manufactured by Porous Materials Inc. Fluorinert (surface tension 16 dynes/cm, manufactured by 3M)) is used to obtain a volume-accumulated pore diameter distribution for the porous support based on ASTM F316-86.

Then, as shown in Table 1, the 50% diameter (D50) and the 90% diameter (D90) of the porous support is calculated from the volume-accumulated pore diameter distribution.

Use of the above pore diameter distribution measurement device enables acquisition of the volume-accumulated pore diameter distribution of a layer having the smallest pore distribution of the porous support. Consequently, the D50 and D90 values shown in Table 1 are values that are related to the outermost layer of the surface layer.

Thickness Measurement of DDR-Type Zeolite Membrane

The average thickness of a layer (first zeolite layer) that penetrates an inner portion of the surface layer of the DDR-type zeolite membrane and the average thickness of a layer (second zeolite layer) that is exposed on an outer portion of the surface layer of the DDR-type zeolite membrane are measured by SEM observation of a cross section of each sample. The arithmetic average value of the thickness measured at three evenly separated positions on an SEM image is taken to be the average thickness.

Water Flux Measurement

Firstly an aqueous solution (referred to below as "supplied solution") containing 50 volume % of ethanol is heated to 50 degrees.

Next, the pressure on an outer side of the outer peripheral surface of the substrate main body is reduced by a vacuum pump and the supplied solution is circulated in an inner side (that is to say, a cell) of the DDR-type zeolite membrane of each sample.

Next, the mass of the permeating solution that is recovered from each sample is weighed by use of an electronic balance. Furthermore, the composition of the permeating solution that is recovered from the outer peripheral surface of each sample is analyzed by gas chromatography.

As shown in Table 1, a water flux ($kg/m^2h$) is calculated based on the analysis results of the permeating solution.

TABLE 1

| Sample No | Seed Crystal D10(μm) | Porous Support (Outermost Layer) D90(μm) | Porous Support (Outermost Layer) D50(μm) | Seed Crystal D10/ Porous Support (Outermost Layer) D90 | Average Thickness First Zeolite Layer (μm) | Average Thickness Second Zeolite Layer (μm) | Average Thickness First Zeolite Layer/ Average Thickness Second Zeolite Layer | Water Flux (Kg/m² · h) |
|---|---|---|---|---|---|---|---|---|
| 1 | 0.116 | 0.056 | 0.055 | 2.1 | 0.2 | 0.9 | 0.2 | 1.90 |
| 2 | 0.116 | 0.058 | 0.057 | 2.0 | 0.4 | 1.0 | 0.4 | 1.88 |
| 3 | 0.100 | 0.078 | 0.076 | 1.3 | 2.5 | 2.0 | 1.3 | 1.04 |
| 4 | 0.116 | 0.105 | 0.102 | 1.1 | 3.5 | 2.6 | 1.3 | 0.56 |
| 5 | 0.110 | 0.091 | 0.088 | 1.2 | 2.9 | 2.4 | 1.2 | 0.87 |
| 6 | 0.140 | 0.074 | 0.071 | 1.9 | 0.8 | 1.4 | 0.6 | 1.60 |
| 7 | 0.116 | 0.080 | 0.077 | 1.5 | 2.5 | 2.0 | 1.3 | 1.35 |
| 8 | 0.116 | 0.074 | 0.072 | 1.6 | 2.0 | 1.8 | 1.1 | 1.38 |
| 9 | 0.116 | 0.067 | 0.065 | 1.7 | 1.4 | 1.5 | 0.9 | 1.48 |
| 10 | 0.116 | 0.071 | 0.070 | 1.6 | 1.4 | 1.5 | 0.9 | 1.45 |
| 11 | 0.116 | 0.070 | 0.069 | 1.7 | 1.3 | 1.5 | 0.9 | 1.36 |
| 12 | 0.116 | 0.068 | 0.065 | 1.7 | 1.3 | 1.5 | 0.9 | 1.49 |
| 13 | 0.074 | 0.093 | 0.090 | 0.8 | 4.0 | 2.8 | 1.4 | 0.45 |
| 14 | 0.060 | 0.120 | 0.116 | 0.5 | 5.1 | 3.0 | 1.7 | 0.23 |
| 15 | 0.060 | 0.100 | 0.097 | 0.6 | 5.0 | 3.0 | 1.7 | 0.35 |
| 16 | 0.060 | 0.120 | 0.115 | 0.5 | 5.4 | 3.0 | 1.8 | 0.21 |
| 17 | 0.052 | 0.100 | 0.096 | 0.5 | 5.3 | 3.2 | 1.7 | 0.21 |
| 18 | 0.116 | 0.150 | 0.144 | 0.8 | 4.3 | 2.8 | 1.5 | 0.46 |
| 19 | 0.060 | 0.150 | 0.144 | 0.4 | 6.2 | 3.0 | 2.1 | 0.11 |
| 20 | 0.052 | 0.150 | 0.143 | 0.3 | 6.4 | 3.0 | 2.1 | 0.14 |

As shown in Table 1, a water flux of greater than or equal to 0.21 kg/m²h is enabled in Sample No. 1 to No. 18 that exhibit an average thickness of the first zeolite layer of less than or equal to 5.4 micrometers, and a D50 of the porous support of greater than or equal to 0.050 micrometers and less than or equal to 0.150 micrometers. This feature is due to the fact that since the ratio of the seed crystal D10 to the outermost layer D90 of the porous support is greater than or equal to 0.5 and the D90 of the outermost layer is greater than or equal to 0.050 micrometers and less than or equal to 0.180 micrometers, dispersion of the seed crystals into an inner portion of the porous support can be inhibited. It is noted that the ratio of the average thickness of the first zeolite layer to the average thickness of the second zeolite layer in Sample No. 1 to No. 18 is less than or equal to 2.0.

A water flux of greater than or equal to 1.04 kg/m²h is enabled in Sample No. 1 to No. 3, and No. 6 to No. 12 that exhibit an average thickness of the first zeolite layer of less than or equal to 2.5 micrometers. This feature is due to the fact that since the ratio of the seed crystal D10 to the outermost layer D90 is greater than or equal to 1.3 and the D90 of the outermost layer is less than or equal to 0.080 micrometers, dispersion of the seed crystals into an inner portion of the porous support can be further inhibited.

Furthermore, a water flux of greater than or equal to 1.60 kg/m²h is enabled in Sample No. 1, No. 2 and No. 6 that exhibit an average thickness of the first zeolite layer of less than or equal to 0.8 micrometers. This feature is due to the fact that since the ratio of the seed crystal D10 to the outermost layer D90 is greater than or equal to 1.9 and the D90 of the outermost layer is less than or equal to 0.074 micrometers, dispersion of the seed crystals into an inner portion of the porous support can be further inhibited.

INDUSTRIAL APPLICATION

According to the present invention, utility is enabled in the field of separation membranes due to enhancement to the permeation characteristics of a zeolite membrane structure.

The invention claimed is:

1. A zeolite membrane structure comprising:
    a porous support, and
    a zeolite membrane,
    the zeolite membrane having a first zeolite layer located in a surface of the porous support, and a second zeolite layer located outside of the surface of the porous support and integrally formed with the first zeolite layer,
    the porous support having an outermost layer in which the first zeolite layer is located,
    an average thickness of the first zeolite layer being less than or equal to 5.4 micrometers, and
    a porosity of the outermost layer being greater than or equal to 20% and less than or equal to 60%.

2. The zeolite membrane structure according to claim 1, wherein
    a ratio of an average thickness of the first zeolite layer to an average thickness of the second zeolite layer is less than or equal to 2.0.

3. The zeolite membrane structure according to claim 1, wherein
    an average thickness of the first zeolite layer is less than or equal to 2.5 micrometers.

4. The zeolite membrane structure according to claim 1, wherein
    an average thickness of the second zeolite layer is less than or equal to 2.4 micrometers.

5. A zeolite membrane structure comprising:
    a porous support, and
    a zeolite membrane,
    the zeolite membrane having a first zeolite layer located in a surface of the porous support, and a second zeolite layer located outside of the surface of the porous support and integrally formed with the first zeolite layer,
    the porous support having an outermost layer in which the first zeolite layer is located,
    an average thickness of the first zeolite layer being less than or equal to 5.4 micrometers, and
    a 90% diameter in a volume-accumulated pore diameter distribution of the outermost layer measured by use of a pore diameter distribution measurement apparatus being less than or equal to 0.080 micrometers.

6. The zeolite membrane structure according to claim 5, wherein
a ratio of an average thickness of the first zeolite layer to an average thickness of the second zeolite layer is less than or equal to 2.0.

7. The zeolite membrane structure according to claim 5, wherein
an average thickness of the first zeolite layer is less than or equal to 2.5 micrometers.

8. The zeolite membrane structure according to claim 5, wherein
an average thickness of the second zeolite layer is less than or equal to 2.4 micrometers.

9. A zeolite membrane structure comprising:
a porous support, and
a zeolite membrane,
the zeolite membrane having a first zeolite layer located in a surface of the porous support, and a second zeolite layer located outside of the surface of the porous support and integrally formed with the first zeolite layer,
the porous support having an outermost layer in which the first zeolite layer is located,
an average thickness of the first zeolite layer being less than or equal to 5.4 micrometers,
a ratio of an average thickness of the first zeolite layer to an average thickness of the second zeolite layer is less than or equal to 2.0, and
a water flux through the zeolite membrane structure is greater than or equal to 0.21 kg/m$^2$h.

10. The zeolite membrane structure according to claim 9, wherein
the water flux is greater than or equal to 1.04 kg/m$^2$h.

11. The zeolite membrane structure according to claim 9, wherein
the water flux is greater than or equal to 1.60 kg/m$^2$h.

12. The zeolite membrane structure according to claim 9, wherein
an average thickness of the first zeolite layer is less than or equal to 2.5 micrometers.

13. The zeolite membrane structure according to claim 9, wherein
an average thickness of the second zeolite layer is less than or equal to 2.4 micrometers.

* * * * *